May 23, 1967  E. GOLDBAUM  3,321,731
MARKER LAMP ADAPTED FOR MOUNTING ON AN AUTOMOTIVE
VEHICLE, AND CONNECTION INTO AN ELECTRICAL
CIRCUIT, WITHOUT THE USE OF TOOLS
Filed July 13, 1964  3 Sheets-Sheet 2
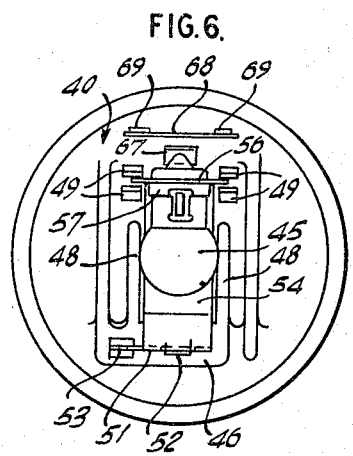
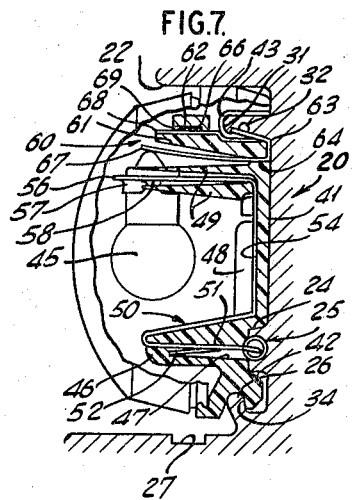
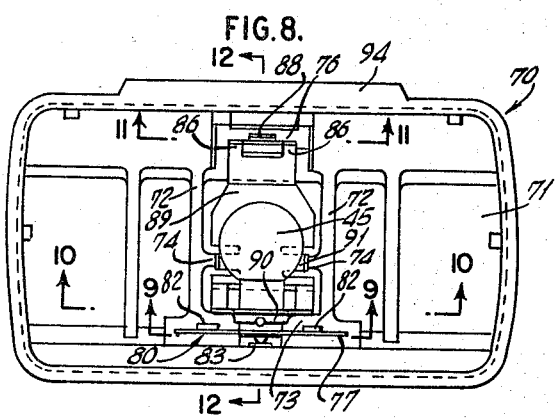
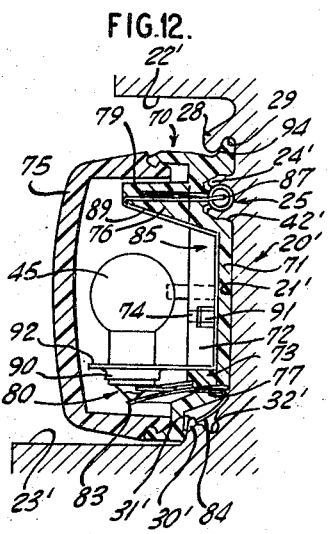
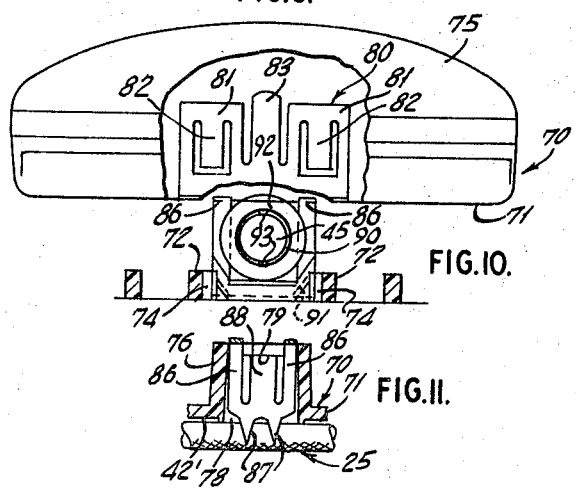
INVENTOR.
ELLIOTT GOLDBAUM
BY Blum, Moscovitz,
Friedman, Blum + Kaplan
ATTORNEYS May 23, 1967 E. GOLDBAUM 3,321,731
MARKER LAMP ADAPTED FOR MOUNTING ON AN AUTOMOTIVE
VEHICLE, AND CONNECTION INTO AN ELECTRICAL
CIRCUIT, WITHOUT THE USE OF TOOLS
Filed July 13, 1964 3 Sheets-Sheet 3
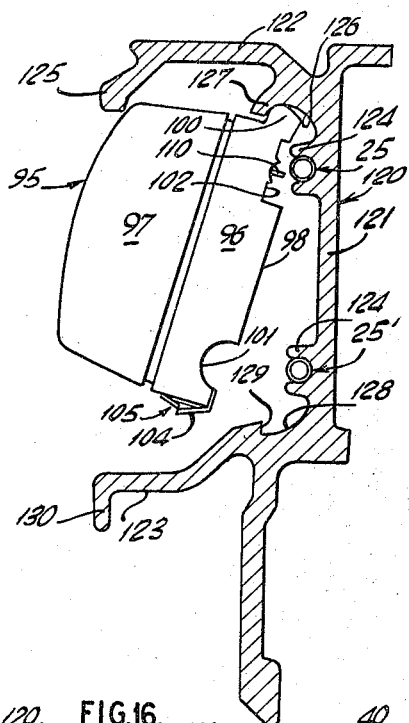
FIG.14.
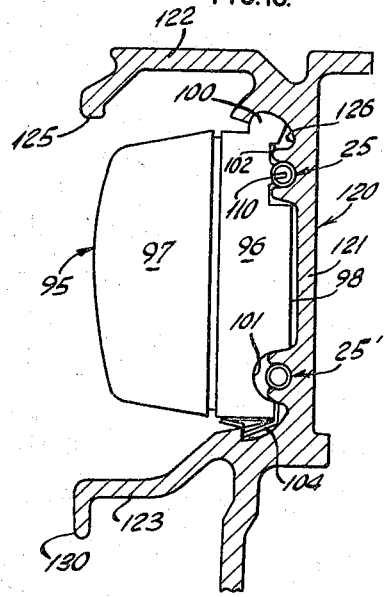
FIG.15.
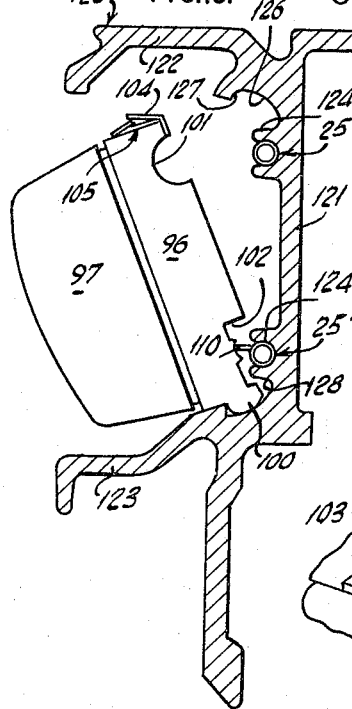
FIG.16.
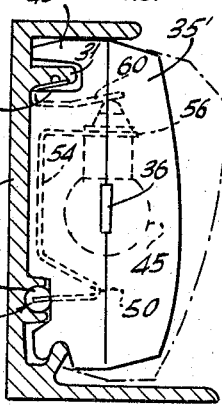
FIG.13.
FIG.17.
FIG.18.
INVENTOR.
ELLIOTT GOLDBAUM
BY Blum, Moscovitz,
Friedman, Blum & Kaplan
ATTORNEYS

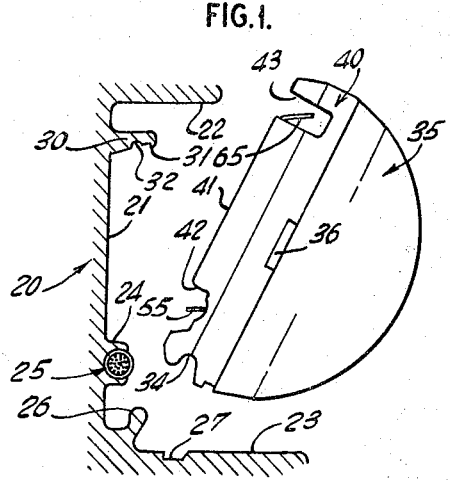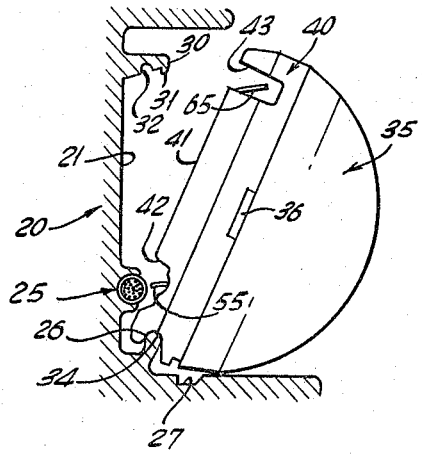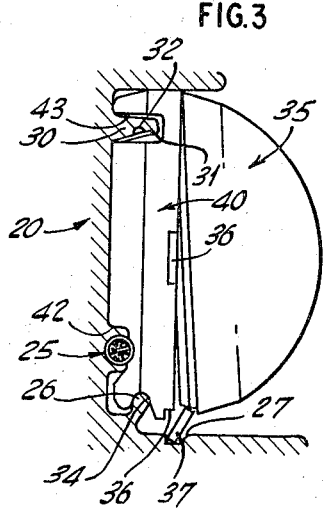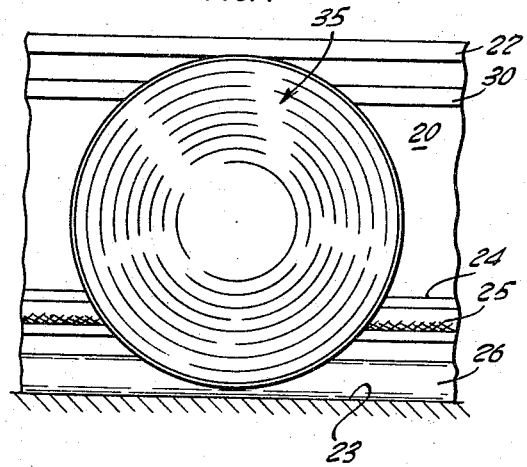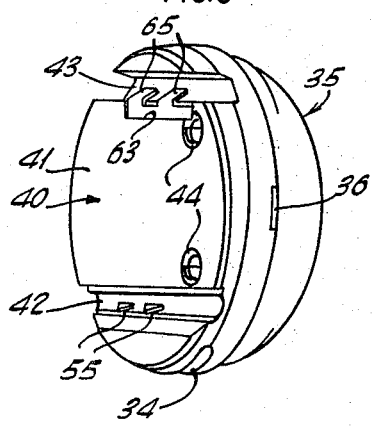

3,321,731
MARKER LAMP ADAPTED FOR MOUNTING ON AN AUTOMOTIVE VEHICLE, AND CONNECTION INTO AN ELECTRICAL CIRCUIT, WITHOUT THE USE OF TOOLS
Elliott Goldbaum, Brooklyn, N.Y., assignor to Lehigh Valley Industries, Inc., New York, N.Y., a corporation of Delaware
Filed July 13, 1964, Ser. No. 382,000
10 Claims. (Cl. 339—21)

This invention relates to marker lamps such as used on commercial automotive vehicles, particularly trucks and trailers, and more particularly to a novel marker lamp which may be mounted on such a vehicle and connected into an electric energizing circuit without the use of tools.

Commercial automotive vehicles, such as trucks, trailers and buses are frequently provided with a header or "quarter panel" extending around the sides thereof generally near the roof. This header or "quarter panel" serves as a mounting for one or more marker lamps, the number and type of which are usually determined by legal requirements or by regulations of public service commissions or of the Interstate Commerce Commission. For the purpose of connecting the lamps mounted thereon into one or more energizing circuits, the header is usually provided with at least one insulated conductor extending therealong which may be connected to appropriate terminals of the lamps mounted on the header. A grounding conductor is not essential, as the lamps may be grounded through a metal lamp housing or base which is secured by metal fasteners to the metal header or quarter panel.

As presently used, such lamps must be mounted on the header by the use of suitable fasteners, such as screws or bolts, and connection of the lamps into an energizing circuit involves the stripping of the ends of conductors and fastening of the bared conductor ends to one or more terminals in the lamp. This is a time consuming and expensive proposition, particularly where replacement of defective lamps or where change of lamps may be necessary or desirable. Specifically, it requires the use of tools, such as a screwdriver and frequently a pair of pliers or a wrench. Where a lamp may have to be changed or replaced during a road run, as for example when it may have been damaged by a collision or a blow, difficulty is experienced in making such change due to the necessity of using a screwdriver, pliers or a wrench to disconnect and dismount a damaged lamp and replace the lamp with a new and operative lamp, properly connected into the electric energizing circuit therefor. Accordingly, various proposals have been made to simplify the installation and connection of such lamps, and to facilitate their replacement when damaged or when necessary or desirable for any other reason.

Among the proposals made has been one which involves the use of one mounting screw acting as the grounding terminal for the lamp, by being threaded into the header or "quarter panel." A second mounting screw is provided with a piercing point, or the like, and is arranged to be aligned with an insulated conductor of an energizing circuit for the lamp. As this latter screw is driven home, its piercing point pierces through the insulation of the conductor and makes electrical contact with the metal of the conductor. However, an arrangement of this type still requires the use of a screwdriver for mounting and dismounting the lamp.

In accordance with the present invention, the disadvantages of prior art marker lamps are overcome by a novel marker lamp in association with a novel header or quarter panel construction, whereby the lamp may be pivotally snapped into operative position in the header without the use of tools, with this pivoting effecting connection of one lamp terminal to an insulated conductor, and with the lamp being provided with automatic snap latching means cooperable with the header not only to retain the lamp in mounted position on the header but also to establish a grounding connection from the other terminal of the lamp to the header.

More particularly, a novel header or quarter panel is provided which has a generally channel shape cross section including a base and flanges. This quarter panel is provided with a rib or projection extending longitudinally outwardly from the inner surface of its base in somewhat spaced relation to a flange, and this rib or projection is longitudinally grooved to receive an insulated electrical conductor extending therealong, the insulated conductor projecting to at least some extent from the recess in the rib. The header or quarter panel is further provided with pivot surface means thereon extending longitudinally thereof in laterally outwardly spaced relation to the conductor supporting rib. Thus, the pivot surface means is nearer to one flange than is the conductor. In spaced relation to the other flange, a rib or the like is provided to extend longitudinally of the base of the channel shaped header, and this rib is provided, on one or both surfaces, with suitable shoulder formations extending longitudinally thereof.

The lamp comprises a base which is formed, on its under surface, with a pair of substantially parallel grooves, one of which is adapted to embrace the conductor supporting rib and the other of which is adapted to embrace the other rib formed with the latching shoulders. A lamp socket is mounted on the base and has terminal strips extending therefrom into each of these grooves. One terminal strip projects from one groove and has barbs or points on its outer end, and the other terminal strip projects into the other groove, at a point spaced from the base of the latter, and extends toward the base. The lamp base is further formed with pivot means in a side surface thereof for cooperation with the pivot surface means of the header. A lens may be detachably engaged with the base to enclose the lamp socket and a lamp mounted therein.

To mount the lamp in the header, the pivot means of the lamp base are engaged with the pivot surface means of the header, with the lamp extending outwardly at an angle to the base of the header. The lamp is then pivoted inwardly to engage the grooves in its base with the ribs on the base of the header. This causes the first mentioned lamp socket terminal, which is pointed, to pierce the insulation of the conductor and to make metallic contact therewith, so that this terminal becomes the "live" terminal of the lamp. As the other groove on the base is engaged with the rib having the latching shoulders thereon, the other terminal of the lamp socket slides inwardly along a surface of this rib and snaps outwardly to engage a latching shoulder to retain the lamp engaged with the rib on the header. It should be noted that the groove having the lamp latching means is the one spaced further from the pivot means of the base. The lamp may be disengaged easily by using a coin, blade, or the like, to depress the reentrant grounding terminal of the lamp base to disengage it from beneath the latching shoulder on the associated rib, after which the lamp easily may be swung outward to disengage the other socket terminal from the conductor. It will be noted that the reentrant terminal of the lamp socket, which engages the latching shoulder on the associated rib, thus provides a metallic grounding connection to the header for the lamp.

For an understanding of the principles of the invention, reference is made to the following description of typical embodiments thereof as illustrated in the accompanying drawings. In the drawings:

FIGS. 1 and 2 are side elevational views illustrating two steps in the mounting of one form of lamp, embodying the invention, on a quarter panel or header;

FIG. 3 is a side elevational view illustrating the lamp of FIGS. 1 and 2 as mounted on the header, and further illustrating how the lens may be disengaged from the lamp base for access to the interior of the lamp;

FIG. 4 is a front elevational view of the lamp and header shown in FIG. 3;

FIG. 5 is a bottom perspective view of the lamp shown in FIGS. 1 through 4;

FIG. 6 is a plan view of the lamp shown in FIGS. 1 through 5, with the lens removed and illustrating the internal arrangement of the lamp;

FIG. 7 is a sectional view through the lamp of FIGS. 1 through 6, as mounted on the header, and illustrating how the connections are made between the lamp socket, the conductors, and the header;

FIG. 8 is a plan view, with the lens removed, of another form of lamp embodying the invention;

FIGS. 9, 10 and 11 are sectional views taken on the lines 9—9, 10—10 and 11—11 of FIG. 8, respectively;

FIG. 12 is a transverse sectional view, taken along line 12—12 of FIG. 8, of the lamp shown in FIG. 8 as mounted on a header;

FIG. 13 is a view, generally similar to FIG. 3, illustrating a slightly modified form of lamp as mounted on a quarter panel or header;

FIGS. 14, 15 and 16 are part elevational and part sectional views illustrating another embodiment of the lamp, arranged for snap mounting on a header, and in which the lamp may be reversed to engage either one of a pair of insulated conductors supported by the header;

FIG. 17 is a view, similar to FIGS. 14, 15 and 16, illustrating how the lamp of FIGS. 14, 15 and 16 may be easily disengaged for removal from the header; and FIG. 18 is an enlarged perspective view further illustrating the means for readily removing the lamp of FIG. 17 from the header.

While the invention may be used with any type of recessed or channel metal construction of an automotive vehicle, it will be described, more particularly, as directed to mounting of marker lamps or the like in the "quarter panel" of a truck trailer or semi-trailer. This "quarter panel" is an outwardly facing channeled shaped rail or header which extends along the upper edge of the side and end walls of the trailer or semi-trailer at the junction thereof with the roof. The reason for describing the invention as applied more particularly to mounting lamps in such a "quarter panel" or header is that such construction is very commonly, if not exclusively, used in trailers and semi-trailers arranged to be pulled by truck tractors. The metal quarter panel or header may be formed, for example, by extrusion of aluminum or other suitable metal, and is in the form of an outwardly opening channel, thus providing a recess for the mounting of the marker lamps. It will be apparent, as the description proceeds, that the quarter panel may have several different specific configurations but each one of these configurations will have certain distinctive features of novelty in common with each of the other different configurations. The variations between the different configurations of the quarter panel or header are for the purpose of accommodating different types of lamps, all constructed in accordance with the underlying principles of the invention.

Referring first to FIGS. 1 through 7, a heavy header 20 for a truck trailer or semi-trailer is illustrated as forming a lamp-carrying means for carrying a lamp at any selected location therealong and comprising a metal extrusion in the form of a channel having a base 21, an upper flange 22, and a lower flange 23. An insulated "live" conductor 25 is illustrated as mounted to extend along the header 20, and conductor 25 is preferably partially recessed in a groove in the header. In the particular construction illustrated, the conductor 25 is shown as partially recessed within a rib 24 extending from base 21 and having an outwardly facing recess to receive the conductor 25. Conductor 25 is connected to a suitable source of potential, such as one of the terminals of the vehicle battery or generator, and particularly the ungrounded terminal thereof. Depending upon the particular circuit arrangement used, the ungrounded terminal may be either the positive or the negative terminal of the battery or generator. In any event, conductor 25 has applied thereto a potential other than ground potential, whereas header 20 constitutes a metallic ground connection which, through the metal of the trailer and of the truck, as well as suitable connectors, is connected to the grounded terminal of the battery or generator. It will be noted that conductor 25 is so positioned along base 21 of header 20 that a substantial arcuate extent of the conductor 25 is exposed outwardly and, in the particular embodiment illustrated, the conductor 25 projects somewhat from the outer end of the rib 24. The purpose of this will become apparent as the description proceeds.

In accordance with the invention, header 20 is formed with pivot surface means 26 spaced between conductor supporting rib 24 and flange 23. In other words, the pivot surface means is spaced outwardly of the rib 24 with respect to the channel header 20. In the arrangement shown in FIGS. 1 through 7, this pivot surface means comprises a rib running longitudinally of header 20 and extending somewhat obliquely from about the intersection of base 21 and flange 23, this rib 26 having a rounded outer edge. For a purpose to be described, the inner surface of lower flange 23, a little outwardly of the pivot surface rib 26 is formed with a groove 27 extending therealong.

A second rib 30 extends from base 21 nearer to flange 22 than to conductor 25. This rib 30, which will be hereinafter referred to as a latching or locking rib, has a locking formation on its inner surface, which is the surface facing toward the conductor 25. This locking formation comprises a lip 31 having a somewhat rounded outer edge and an abrupt inner edge, the lip being so formed for a purpose which will appear hereinafter. Inwardly of lip 31, the inner surface of rib 30 is formed with a recess 32 extending longitudinally thereof and which is preferably arcuate in section. This recess 32 is for the purpose of receiving a tool or the like for disengaging a marker lamp from the header 20.

Header 20 is arranged to mount a marker lamp comprising a base 40 having a lens 35 detachably mounted thereon. Lamp base 40 has a generally flat under or mounting surface 41 which is formed with a pair of laterally spaced parallel grooves 42 and 43. Grooves 42 and 43 have the same lateral spacing as conductor 25 and rib 30. Groove 42 is arranged to have a closely conforming fit over the slotted rib 24 mounting the conductor 25, whereas groove 43 is arranged to have a somewhat looser fit over the locking rib 30. Base 40 is formed of a suitable dielectric material, such as a plastic composition material, having some resiliency. A mounting means is carried in part by the lamp and in part by the header for mounting the lamp thereon without use of tools.

Lens 35 is arranged to have a snap action fit within the rim of base 40, in a manner described more fully hereinafter, and this lens, in cooperation with base 40, encloses a suitable lamp socket and lamp bulb assembly of the type commonly used in automotive vehicle lamps. For versatility, the mounting surface 41 of base 40 may be formed with apertures 44 for receiving suitable conductor terminals when it is desired to mount the lamp in a rubber housing or the like.

Before describing how the lamp is mounted in header 20, a description of the socket assembly will be given with particular reference to FIGS. 6 and 7. Base 40 is formed with a laterally extending rib 46 which is aligned with lower groove 42 and has a passage therethrough, indicated at 47, extending into groove 42. Passage 47 is enlarged to provide a shoulder somewhat inwardly of its free end. A pair of reinforcing ribs 48 extend along the base 40 from the rib 46. Spaced somewhat from the ends of ribs 48 there are two pairs of upstanding ears 49, the two pairs being laterally spaced from each other. The parts just described serve to mount and position one-half of the socket assembly which, in the present instance, constitutes the live terminal of the socket assembly and is arranged to have electrical contact with the periphery of the base of a lamp bulb 45 of the bayonet type.

This socket portion 50 is formed of a suitable electrically conductive metal such as copper, brass, or Phosphor bronze, and includes a flat strip portion 51 which is arranged to be inserted through the passage 47 of ribs 46, and has a stuck-out tongue 52 arranged to engage and lock beneath the shoulder of passage 47. Strip portion 51 also has a lateral extension 53 which is barbed to be engaged in a lateral extension of rib 46. Strip portion 51 is continued as a strip 54 which extends over the inner sloping surface of rib 46 and along the base portion of the lamp housing between the ribs 48. Adjacent the ears 49, strip portion 54 is bent at right angles to the base of the housing, as indicated at 56, and is widened so that its lateral portions lie between the ears 49 of each pair. Portion 56 projects above the upper or outer ends of ears 49 and is there formed with a cylindrical socket portion 57 having slots or grooves 58 to receive the pins on the base of lamp bulb 45.

The other half of the socket assembly is indicated at 60 as comprising a bent and formed strip of electrically conducting metal such as copper, brass, or Phosphor bronze. Just inwardly of the upper groove 43, the inner surface of the base of lamp housing 40 is formed with a transversely extending rib or partition 61 having an offset 62 substantially aligned with upper groove 43. In alignment with partition 61, the mounting surface 41 of the lamp housing 40 is formed with a recess 63 which connects a slot 64 in the base with the interior of upper groove 43. A further slot 66 is formed between off-set 62 and partition 61, this further slot being shouldered as indicated.

Socket member 60 includes a spring finger 67 extending through slot 64 and positioned so as to be engaged by the base contact of lamp bulb 45. The socket member 60 has a bent portion lying in recess 63 and an inwardly extending strip portion 68 which passes through the slot 66 and has one or more tongues 69 engageable with the shoulder in this slot to lock the socket member 60 in position. A spring finger 65, which forms the latch finger, projects outwardly from portion 68 so that, when the lamp is mounted in header 20, this spring finger will engage the lip 31 of the latching rib 30.

The socket portion 50 has, at the end of portion 51, two or more barbs 55 projecting from the bottom surface of the lower groove 42. In addition, the base of lamp housing 40, as best seen in FIGS. 1 through 5 and 7, is formed with pivot means 34 engageable with the pivot surface means 26 of header 20. In the particular lamp housing illustrated, this pivot means comprises a groove 34 extending chordally of the periphery of the base of lamp housing 40, and parallel to the grooves 42 and 43.

To mount the lamp in position, pivot groove 34 is engaged with pivot rib 26, in the manner shown in FIGS. 1 and 2. The lamp is then swung toward the base 21 of header 20, about the interengaged pivot portions 26 and 34. This causes barb means 55 to pierce the insulation of conductors 25 and to establish electrical contact with the metallic wire within the conductor. Upon further movement of the lamp toward the base 21 of header 20, groove 43 will engage rib 30 and spring 65 will slide along the inner surface of this rib until such time as its end snaps behind the lip 31 to lock the lamp in position in the header. This also establishes a grounding contact for the lamp, by virtue of the intermetallic contact of metallic finger 65 and lip 31 of metallic rib 30. To release the lamp, it is merely necessary to insert the end of a blade or wire along the groove 32 in the face of rib 30 and then to move finger 65 out of engagement with lip 31. The lamp may then be swung to the position of FIG. 2 and then removed as shown in FIG. 1.

Lens 35 has a snap action fit in the plastic base 40. For this purpose, the rim of lens 35 may be formed with grooves or ribs or the like arranged to have a snap interfit with grooves or ribs in the rim of base 40. The base or housing 40 may be formed with notches, such as 36, adjacent its upper edge arranged to receive a blade or a coin for forcing lens 35 out of its snap action fit with housing 40 in order to obtain access to the interior of the lamp, as for replacement of a lamp bulb or the like. For example, and referring to FIG. 3, a blade 37 may be engaged in the groove 27 in the lower flange 23 of header 20 and be engaged in the notch 36 of housing 40 so as to bear against the inner edge of lens 35. By twisting blade 37, lens 35 may be readily disengaged from lamp housing 40, as particularly shown in FIG. 3.

The principles of the invention are adaptable to lamps irrespective of the shape. Thus, while the lamp illustrated in FIGS. 1 through 7 is circular in plan, the invention may be equally adapted to use with the lamp which is oval or rectangular in plan, as shown, for example, in FIGS. 8 through 12. Referring to these figures, the quarter panel or header 20' is again channel shaped, having a base 21', an upper flange 22' and a lower flange 23'. However, the header 20' differs slightly in detail from the header 20 of FIGS. 1 through 7. Thus the latching rib 30' is, in FIGS. 8 through 12 located nearer to the lower flange 23', and is still provided with its latching shoulder or lip 31', and with an adjacent release groove 32'. Conductor 25 is again embedded in a channel rib 24' extending longitudinally of header 20'. While the pivot surface means of the header is again adjacent to the conductor 25, in the arrangement of FIGS. 8 through 12 the pivot surface means comprises a rib 28 which slopes inwardly from base 21' and away from upper flange 22'. This rib 28 has a rounded end which merges into a rounded groove 29 at the juncture of rib 28 with base 21'.

The lamp shown in FIGS. 8 through 12 includes a housing or base 70 and a lens 75. Housing 70 is molded from a suitable dielectric plastic composition material such as, for example, polypropylene. Housing 70 includes a substantially flat base 71 arranged to engage the base 21' of header 20' between rib 24' and groove 32'.

Housing 70 is substantially rectangular in plan with rounded ends and has a general overall appearance conforming substantially to known marker lamps.

On the inner surface of base 71 there is formed a pair of ribs 72 extending transversely thereof and interconnected at one end by a longitudinal rib 73. Intermediate their ends, ribs 72 are formed with inwardly facing projecting abutments 74. In between the ends of ribs 72 adjacent to the ends interconnected by rib 73 there is a generally trapezoidal partition or wall 76 formed on the inner surface of base 71.

Longitudinal rib 73 is formed with a slit 77 extending therealong which receives the ground contact assembly 80. As best seen in FIGS. 9 and 12, ground contact assembly 80 comprises a strip of electrically conductive metal such as copper, brass or Phosphor bronze. This strip includes an enlarged inner end including side sections 81 each having a tongue 82 bent therefrom. Intermediate the side sections 81 there is a spring contact 83 which extends somewhat above the side sections 81. The contact strip 80 is bent intermediate its ends to form a latching finger 84. In mounting the contact assembly 80 in the base 71, the larger end is pushed inwardly through the slit 77 until tongues 82 snap into recesses in rib 73, thus locking the contact assembly in position with the latching finger 84 extending obliquely from the exterior of the base.

Trapezoidal partition 76 is aligned with a groove 42' in the outer surface of base 71, this groove 42' being arranged to engage over the rib 24' mounting the conductor 25. Wall 76 is formed with an elongated slit 78 opening through the top of wall 76 and into groove 42'. Slit 78 is reduced near its upper or outer end to form a shoulder 79. Slit 78 serves to anchor the socket assembly 85 in position.

Referring to FIGS. 8 through 12, socket assembly 85 is formed of suitably electrically conductive strip metal, such as copper, brass or Phosphor bronze, and includes a relatively flat portion insertable downwardly or inwardly through slit 78. This flat portion comprises side strips 86 joined together at their bottom edge by a cross piece having prongs 87 which pierce the insulation of conductor 25 to make metallic or electrical contact with the wire within the insulation. The pronged portion further includes a substantially central tongue 88 which, when the prong portion is pushed through the slit 78, snaps into engagement with shoulder 79 to anchor the socket assembly 85 into the partition walls 76. The strips 86 are integral extensions of a relatively wider portion 89 which lies against one surface of wall 76 and extends along the inner surface of base 71 between the ribs 72. At a short distance from the shoulder 74 of ribs 72, the wider portion 89 is reduced in width and this reduced width portion has obliquely forwardly extending tongues 91 which lie against the shoulders 74. At the rib 73, the contact strip is bent at right angles to form a projecting portion 92 which is generally annular in cross section and has a central punch-out portion forming a socket 90. Socket 90 telescopingly receives the base of lamp bulb 45 and has a pair of notches 93 in its free edge to engage and position the pins on the base of bulb 45. The socket strip 92 is relatively close to the contact finger 83 of contact assembly 80. Thus, when a bulb 45 has its base engaged in socket 90 and its pins anchored in the notches 93, its central base contact will engage and deflect the contact 83 of ground contact assembly 80. It will also be noted that the prongs 87 project into the groove 42'.

In the embodiment of FIGS. 8 through 12, the pivot means on the base comprises a relatively elongated flange 94 extending along one side of base 71 and having a rounded outer edge. Thus, in mounting the lamp on the header 20', the rib or flange 94 is engaged in the groove 29 with the lamp being extending downwardly and outwardly. The lamp is then swung toward the position of FIG. 12, pivoting about the interengaging surfaces of rib 94 and groove 29. This causes barbs 87 to pierce the insulation of conductor 25 and to make electrical contact with the wire of the conductor. As the outer surface of base 71 moves into engagement with the base 21' of header 20', the latching strip 84, which has been riding over the rib 31', snaps behind this rib to snap-lock the lamp in position and also to make the grounding contact for the lamp. To release the lamp, a blade may be inserted into the groove 32' to engage the latching strip 84 and move the latter out of engagement with shoulder 31'. The lamp may then be readily dismounted from header 20' by a reverse operation.

The lens 75 of the lamp of FIGS. 8 through 12 has a snap action fit within the flexible rim of the housing 70, and may be readily removed from such rim in the same manner as described for the lens 35 and housing 40 of FIGS. 1 through 7.

FIG. 13 illustrates a lamp which is substantially identical with that shown in FIGS. 1 through 7 except for a slightly different shape lens 35'. FIG. 13 further provides a clear view of how the ground contact and the live contact with the socket receiving the bulb 45 is effected. As the construction is substantially identical to that of FIGS. 1 through 7, no detailed explanation is believed necessary.

It is sometimes desirable to make provision for a lamp, mounted in a quarter panel or the like, to be connected to either one of a pair of energizing circuits for selective use under different conditions of operation. Such an arrangement, in accordance with the principles of the present invention, is illustrated in FIGS. 14 through 18. Referring to these figures, the quarter panel or header 120 again as a generally channel shaped cross section lamp receiving portion including a base 121, an upper flange 122, and a lower flange 123. The inner surface of base 121 is formed with a pair of grooved ribs 124 extending therealong in spaced parallel relation and each spaced somewhat from upper flange 122 or lower flange 123, respectively. The uppergrooved rib 124 receives a conductor 25 and the lower grooved rib 124 receives a conductor 25'. Outwardly of upper grooved rib 124, header or quarter panel 120 is formed with a longitudinally extending recess or groove 126 having a surface which is arcuate in transverse section, and groove 126 is terminated by means forming a lip or flange 127. This groove 126 forms one of two pivot surface means of header 120. The other pivot surface means of the header comprises a groove 128 extending longitudinally of the header outwardly of the lower grooved rib 124, this groove 128 having an inner surface which is arcuate in transverse cross section and which terminates in an abrupt shoulder 129. A downturned lip 125 extends along the free edge of upper flange 122, and a downturned lip 130 extends along the free edge of lower flange 123. The conductors 25 and 25' are connected in two respectively different energizing circuits, and each conductor has a potential with respect to ground, whereas the header 120 is grounded and forms a ground return for each of the two circuits represented by the conductors 25 and 25'.

Lamp 95, arranged for snap action mounting in header 121, may be either of the types previously described. This lamp includes a base or housing 96 and a lens 97, the base or housing being molded of flexible plastic composition material and the lens being snapped into position in the housing. Housing 96 includes a substantially flat base 98 which, adjacent one edge, is formed with an arcuate cross section groove 101 extending longitudinally or chordally thereof and, adjacent the other end, is formed with a substantially rectangular notch 102 opening outwardly of the periphery of the housing and extending parallel to the groove 101 and in spaced relation thereto. Groove 101 and notch 102 are arranged to have substantially mating fits with either of the ribs 124. Outwardly of notch 102, base 98 of housing 96 is formed with a substantially rectilinearly extending rib or flange 100 having a curved surface arranged to cooperate with the curved surface of groove 126 or 128.

In the same manner as described for the preceding embodiments of the lamp, the lamp 95 includes a lamp bulb socket having a live terminal and a grounded terminal. The live terminal includes a barbed or pointed end 110 projecting into the notch 102 for piercing the insulation of conductor 25 or 25' to make metallic and electrical contact with the wire of the conductor. The grounding terminal is indicated at 105 and extends through a slit in base 98 of housing 96, is bent over this base, and is then bent along the outer periphery of the base. The details of grounding terminal 105 are best shown in FIGS. 17 and 18. The grounding and latching portion of this terminal comprises a pair of separated substantially parallel strips 103 extending along the outer periphery of housing 96. A pair of relatively shorter tongues 104, which may have serrated ends, are bent outwardly from the strips 103 intermediate the latter. Strips 104 are interconnected by an operating finger 106 which is connected to the strips 104 by triangular flanges 107. Operating finger 106 is curved longitudinally so that it has a free end bearing against the exterior surface of housing 96 and a portion, intermediate its ends, which is spaced from housing 96.

Lamp 95 may be mounted so as to be connected to either one of the conductors 25 or 25' by engaging rib 100 in the groove 126 or 128 nearest to the conductor 25 or 25' to which the lamp is to be connected. The lamp is then swung inwardly, which causes the barbed terminal portion 110 to pierce conductor 25 or 25' and make electrical contact with its metallic core. As the lamp is swung further in until base 98 is substantially parallel to base 121 to header 120, the spring latch fingers 104 ride over the lip 127 or the shoulder 129 and snap in behind the lip or the shoulder to releasably snap-lock lamp 95 in position. These fingers 107, due to their contact with lip 127 or shoulder 129, form a grounding connection for lamp 95.

To release the lamp, blade 37 is inserted longitudinally along operating finger 106, as best shown in FIGS. 17 and 18, and then pivoted, as by bearing against the lip 125 or the outer edge of flange 123 of header 120, to depress operating finger 106 and move latch fingers 104 toward the side wall of housing 96 of the lamp. This disengages the ends of latch fingers 104 from lip 127 or shoulder 129, and allows pivoting of the lamp outwardly to withdraw barb terminal 110 from conductor 25 or 25', and thus completely release the lamp. FIGS. 14 and 15 show the lamp in the nearly mounted position and in the completed mounted position, respectively, where the lamp is to be connected to conductor 25. FIGS. 16 and 17 are similar views showing the lamp as being connected to conductor 25', with FIG. 17, in cooperation with FIG. 18, illustrating how the lamp may be unlatched or disconnected from the header for removal therefrom.

It will be noted that the invention provides a marker lamp which may be mounted on a quarter panel or header merely by being snapped into position, with such snapping into position automatically connecting the live terminal of the lamp to a signal line conductor, and automatically grounding the other terminal of the lamp by a metallic ground to the header, this latter metallic ground also acting as a latching means, in the preferred embodiments, to hold the lamp releasably in its mounted position.

While specific embodiments of the invention have been shown and described in detail to illustrate the application of the principles of the invention, it will be understood that the invention may be embodied otherwise without departing from such principles.

What is claimed is:

1. Illuminating structure comprising elongated lamp-carrying means for carrying a lamp at any selected location along said lamp-carrying means, said lamp-carrying means being electrically conductive and forming a ground of an electrical circuit, and said lamp-carrying means carrying an electrical conductor which is at least partly exposed at the exterior of said lamp-carrying means, which is insulated therefrom, and which forms a live portion of said circuit, a lamp assembly including an electrically non-conductive lamp housing, a lamp bulb therein, and live and ground connections for the lamp bulb, and mounting means carried in part by said lamp-carrying means and in part by said housing for mounting the latter on said lamp-carrying means without the use of tools, said housing when thus mounted on said lamp-carrying means having its live connection engaging said conductor and its ground connection engaging said lamp-carrying means so that when said circuit is closed said bulb will be illuminated, said ground connection of said lamp housing including an electrically conductive springy member at the exterior of said housing, said lamp-carrying means having a projecting portion engaging said springy member for providing with the latter a latch structure releasably holding said housing on said lamp-carrying means, and means in said projecting portion defining a space behind said springy member for releasing the same.

2. In an illuminating structure, elongated lamp-carrying means for carrying a lamp at any selected location along said lamp-carrying means, a lamp assembly, rib-and-groove means carried in part by said lamp assembly and in part by said lamp-carrying means and including a rib and a groove receiving said rib therein for holding said lamp assembly on said lamp-carrying means when said lamp assembly is flush against said lamp-carrying means, said rib-and-groove means cooperating to guide said lamp assembly for turning movement to a position flush against said lamp-carrying means after said rib is introduced into said groove, and releasable latch means carried in part by said lamp assembly and in part by said lamp-carrying means for releasably latching said lamp assembly in said mounted position flush against said lamp-carrying means, whereby said lamp assembly may be mounted on said lamp-carrying means without the use of tools.

3. In a structure as recited in claim 2, said lamp-carrying means carrying an electrical conductor and said lamp assembly carrying an electrically conductive element which electrically engages said conductor when said lamp assembly is mounted on said lamp-carrying means for forming part of an electrical circuit to a bulb which is adapted to be carried by said lamp assembly.

4. In a structure as recited in claim 2, said releasable latching means forming part of a ground connection for a bulb which is adapted to be carried by said lamp assembly.

5. In an illuminating structure, elongated lamp-carrying means for carryinug a lamp at any selected location along said lamp-carrying means, said elongated lamp-carrying means having a longitudinal rib formed with a longitudinal recess, an electrical conductor located in said recess, having a covering of insulation insulating said conductor from said lamp-carrying means, and being exposed at a part of said rib, a lamp assembly formed with a groove for receiving said rib, second rib-and-groove means carried in part by said lamp assembly and in part by said lamp-carrying means for guiding said lamp assembly for turning movement to a position flush against said lamp-carrying means and said second rib-and-groove means retaining said lamp assembly on said lamp-carrying means when said lamp assembly is flush against said lamp-carrying means, said lamp assembly including a live connection for a bulb which is adapted to be carried by said lamp assembly and said live connection including an electrically conductive pointed portion in said groove of said lamp assembly piercing through said covering of said conductor and directly engaging the latter when said lamp assembly is mounted on said lamp-carrying means and reaches said position flush against the same, and latch means carried in part by said lamp assembly and in part by said lamp-carrying means for releasably latching said lamp assembly on said lamp-carrying means.

6. In an illuminating assembly, elongated electrically conductive lamp-carrying means having an elongated central axis and being formed on opposite sides of and symmetrically with respect to said axis with a pair of longitudinal grooves respectively having latching shoulders, said lamp-carrying means having between said grooves and also symmetrically arranged with respect to said axis on opposite sides thereof a pair of ribs respectively formed with longitudinal recesses, a pair of elongated electrical conductors respectively located in said recesses and each having a covering of insulation insulating the same from said lamp-carrying means, a lamp assembly having a rib which is adapted to be selectively received in one of said grooves for cooperating with the selective groove to guide said lamp assembly for turning movement to a position flush against said lamp-carrying means, said lamp assembly carrying a springy latch member which is received in the other of said grooves and cooperates with said latching shoulder thereof for releasably holding said lamp assembly in its position flush against said lamp-carrying means, and said lamp assembly having a live connection for a lamp bulb therein, said connection including an electrically conductive pointed portion at the exterior of said lamp assembly piercing through said covering of insulation and engaging electrically one or the other of said conductors depending upon which of said grooves is selected for receiving said rib, whereby when said conductors respectively form parts of different electrical circuits said lamp assembly may selectively be connected with one or the other of said circuits.

7. An illuminating assembly comprising elongated electrically conductive lamp-carrying means for carrying a lamp at any selected location along said lamp-carrying means, said lamp-carrying means being formed with a longitudinal groove, a longitudinal latching rib parallel to and distant from said groove, and an intermediate rib located between and extending parallel to said groove and latching rib, said intermediate rib being formed with a longitudinal recess, an elongated electrical conductor located in said recess and having a covering of insulation insulating said conductor from said lamp-carrying means, said lamp-carrying means itself being electrically conductive and forming part of a ground of an electrical circuit, a lamp assembly having an electrically non-conductive housing carrying a rib which is adapted to be received in said groove of said lamp-carrying means to cooperate therewith for guiding said housing to a mounted position flush against said lamp-carrying means with said rib cooperating with said groove to prevent removal of said housing from said lamp-carrying means, said housing carrying at its exterior a latching member which engages said latching rib to releasably prevent removal of said housing from said lamp-carrying means once said housing is mounted thereon, and said housing having a live connection for a lamp bulb adapted to be mounted therein and said live connection including an electrically conductive pointed portion at the exterior of said housing piercing through said covering of insulation during mounting of said lamp housing on said lamp-carrying means and directly engaging said conductor when said housing is mounted on said lamp-carrying means.

8. In an illuminating structure, elongated electrically conductive lamp-carrying means for carrying a lamp at any selected location along said lamp-carrying means, said lamp-carrying means having a longitudinal latching rib and a longitudinal mounting rib spaced from and parallel to said latching rib, and said lamp-carrying means including an intermediate rib parallel to and intermediate said latching and mounting ribs, a lamp assembly including a lamp housing of electrically non-conductive material formed with an elongated groove adapted to receive said mounting rib to cooperate therewith for guiding said housing for turning movement to a position flush against said lamp-carrying means, said housing carrying at its exterior a latching member which latches with said latching rib to releasably hold said housing mounted on said lamp-carrying means, said intermediate rib being formed with a longitudinal recess, an elongated electrical conductor located in said recess and having a covering of insulation insulating said conductor from said lamp-carrying means, and said housing carrying a live connection for a lamp bulb which is adapted to be mounted therein and said live connection including a pointed portion at the exterior of said housing piercing through said covering of insulation during mounting of said lamp housing on said lamp-carrying means and directly engaging in said conductor when said housing is mounted on said lamp-carrying means in said position flush against said lamp-carrying means.

9. A structure as recited in claim 8 and wherein said latching member engages said latching rib not only to latch said housing on said carrying means but also to provide part of a ground connection for a lamp bulb which is adapted to be mounted in said housing.

10. In an illuminating assembly, elongated electrically conductive lamp carrying means having an elongated central axis and being formed on opposite sides of and symmetrically with respect to said axis with longitudinal retaining means, said lamp carrying means having between said longitudinal retaining means and also symmetrically arranged with respect to said axis on opposite sides thereof a pair of ribs respectively formed with longitudinal recesses, a pair of elongated electrical conductors respectively located in said recesses and each having a covering of insulation insulating the same from said lamp carrying means, a lamp assembly having interfitting means which is adapted to be selectively received by one of said longitudinal retaining means for cooperating therewith to guide said lamp assembly for turning movement to a position flush against said lamp carrying means, said lamp assembly carrying latch means cooperating with the other longitudinal retaining means for releasably holding said lamp assembly in its position flush against said lamp carrying means, and said lamp assembly having a live connection for a lamp bulb therein, said connection including an electrically conductive pointed portion at the exterior of said lamp assembly piercing through said covering of insulation and engaging electrically one or the other of said conductors depending upon which of said longitudinal retaining means is selected for receiving said interfitting means, whereby when said conductors respectively form parts of different electrical circuits said lamp assembly may selectively be connected with one or the other of said circuits.

References Cited by the Examiner
UNITED STATES PATENTS

| | | | |
|---|---|---|---|
| 671,338 | 4/1901 | Halford | 339—21 |
| 2,800,635 | 7/1957 | Christenbury | 339—99 |
| 3,093,773 | 6/1963 | Cole | 339—91 X |
| 3,130,921 | 4/1964 | Morgan | 240—8.2 |
| 3,150,908 | 9/1964 | Verrone | 339—22 |
| 3,187,172 | 6/1965 | Knapp et al. | 240—8.2 |

MARVIN A. CHAMPION, *Primary Examiner.*

PATRICK A. CLIFFORD, *Examiner.*